US012671201B2

(12) United States Patent
Huang et al.

(10) Patent No.: US 12,671,201 B2
(45) Date of Patent: Jun. 30, 2026

(54) CONDUCTIVE TERMINAL

(71) Applicant: Tyco Electronics (Shanghai) Co., Ltd., Shanghai (CN)

(72) Inventors: Yongjian (Justin) Huang, Shanghai (CN); Tongbao (Tim) Ding, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 405 days.

(21) Appl. No.: 18/359,479

(22) Filed: Jul. 26, 2023

(65) Prior Publication Data

US 2024/0039198 A1 Feb. 1, 2024

(30) Foreign Application Priority Data

Jul. 26, 2022 (CN) ........................ 202210882134.5

(51) Int. Cl.
*H01R 13/02* (2006.01)

(52) U.S. Cl.
CPC .................................. *H01R 13/02* (2013.01)

(58) Field of Classification Search
CPC ............................ H01R 13/02; H01R 4/2429
USPC ........................................................ 439/625
See application file for complete search history.

(56) References Cited

U.S. PATENT DOCUMENTS

| | | | | |
|---|---|---|---|---|
| 4,220,390 A * | 9/1980 | Cobaugh | H01R 4/2462 | 439/401 |
| 7,976,334 B2 * | 7/2011 | Bishop | H01R 4/2433 | 439/404 |
| 8,109,783 B2 * | 2/2012 | Bishop | H01R 4/2433 | 439/404 |
| 10,727,614 B2 * | 7/2020 | Ochi | H01R 4/2437 | |
| 2010/0197163 A1 * | 8/2010 | Ofenloch | H01R 4/2462 | 439/406 |
| 2015/0038003 A1 * | 2/2015 | Sabo | H01R 4/2433 | 439/404 |
| 2019/0020129 A1 * | 1/2019 | Jin | H01R 4/4823 | |
| 2020/0274259 A1 * | 8/2020 | Szelag | H01R 4/2433 | |
| 2022/0209438 A1 * | 6/2022 | Huang | H01R 11/09 | |

* cited by examiner

*Primary Examiner* — Tulsidas C Patel
*Assistant Examiner* — Jeffrey Mountain
(74) *Attorney, Agent, or Firm* — Barley Snyder

(57) ABSTRACT

An insulation displacement terminal adapted to connect to a wire includes a first pair of elastic arms and a second pair of elastic arms. The first pair of elastic arms has a first pair of elastic sub arms arranged opposite to each other in a width direction of the terminal. The first pair of sub arms has a first pair of wire contact parts disposed thereon and are adapted to pierce an insulation layer of the wire such that the first pair of wire contact parts electrically connects to the wire. The second pair of elastic arms is arranged directly adjacent to the first pair of elastic arms in a thickness direction of the terminal. The second pair of elastic arms has a second pair of sub arms arranged opposite to each other in the width direction.

22 Claims, 12 Drawing Sheets

CONDUCTIVE TERMINAL

CROSS-REFERENCE TO RELATED APPLICATIONS

This application claims the benefit of Chinese Patent Application No. 202210882134.5, filed Jul. 26, 2022, the whole disclosure of which is incorporated herein by reference.

FIELD OF THE INVENTION

Embodiments of the present disclosure relate to insulation displacement connectors (IDCs), and more particularly, to a conductive IDC or terminal used for connecting to wires.

BACKGROUND

In the current technical field of IDCs, conductive terminals are used to connect with wires. By way of example, the wire referenced herein refers to a type of magnet wire, also known as winding wire. It is an insulated wire used to manufacture coils or windings in electrical products. Magnet wires are generally classified into enameled wires, lapped wires, enameled lapped wires, and inorganic insulated wires. The wire includes a conductive wire core and an insulation layer. The insulation layer wraps the conductive wire core on the outside, providing electrical isolation. When applying the conductive terminal, the conductive terminal is pressed into a terminal frame that holds a wire, and the insulation layer of the wire is pierced by a wire contact part of the conductive terminal, so that the conductive terminal can be electrically connected to the wire.

However, conductive terminals of the prior art are not suitable for connecting wires of fine wire diameters, such as aluminum enameled wires of a diameter less than 0.45 mm. More specifically, when using a conductive terminal of the prior art to connect with a wire of a fine diameter, the positive force provided by the elastic arms on the terminal for clamping the wire is too large, which may easily cut off the wire directly or cause excessive internal stress and deformation of the wire while piercing. Therefore, suitable electrical connections cannot be guaranteed.

SUMMARY

According to an embodiment of the present disclosure, an insulation displacement terminal adapted to connect to a wire includes a first pair of elastic arms and a second pair of elastic arms. The first pair of elastic arms has a first pair of elastic sub arms arranged opposite to each other in a width direction of the terminal. The first pair of sub arms has a first pair of wire contact parts disposed thereon and are adapted to pierce an insulation layer of the wire such that the first pair of wire contact parts electrically connects to the wire. The second pair of elastic arms is arranged directly adjacent to the first pair of elastic arms in a thickness direction of the terminal. The second pair of elastic arms has a second pair of sub arms arranged opposite to each other in the width direction.

BRIEF DESCRIPTION OF THE DRAWINGS

The invention will now be described by way of example with reference to the accompanying Figures, of which.

DETAILED DESCRIPTION OF THE EMBODIMENTS

Figure 1:
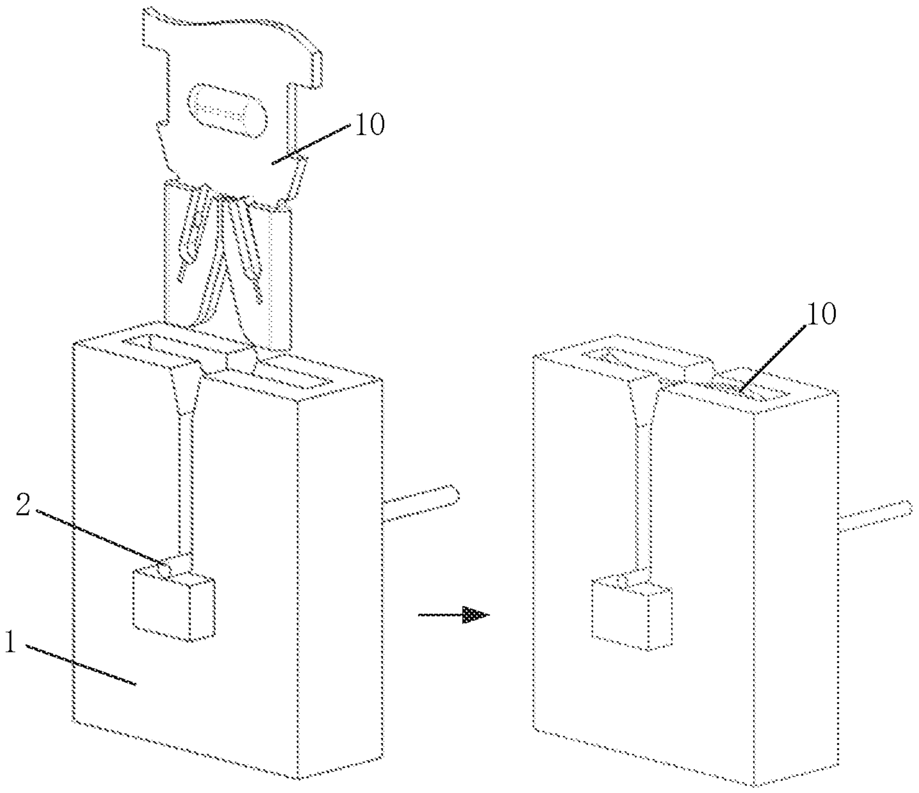
FIG. 1 is a schematic diagram of the insulation piercing and connecting process of a conductive terminal according to a first embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include a conductive terminal disclosed suitable for connecting to thin wires, e.g., an aluminum enameled wire of a diameter ranging from 0.20 to 0.45 mm. The conductive terminal disclosed in the present disclosure can be made of copper, such as brass, by way of non-limiting example only.

First Embodiment

FIG. 1 shows a process diagram of using a conductive terminal 10 of a first embodiment of the present disclosure to perform insulation piercing and connection to a wire 2 clamped in a terminal frame 1. The process diagram of the insulation piercing and connection is also applicable to the conductive terminals in other embodiments of the present disclosure. During the connection process, the conductive terminal 10 is inserted downwards into the terminal frame 1. As sub arms of elastic arms of the conductive terminal 10 pierce an insulation layer of the wire 2, the wire contact parts on the conductive terminal to form an electrical connection with a wire core of the wire 2. Finally, the conductive terminal 10 is retained inside of the terminal frame 1.

Figure 2:
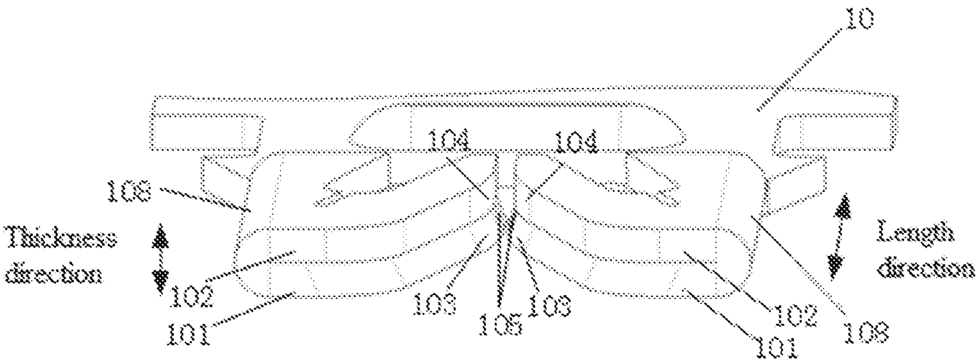
FIG. 2 is a perspective view of the conductive terminal according to the first embodiment of the present disclosure.
Figure 3:
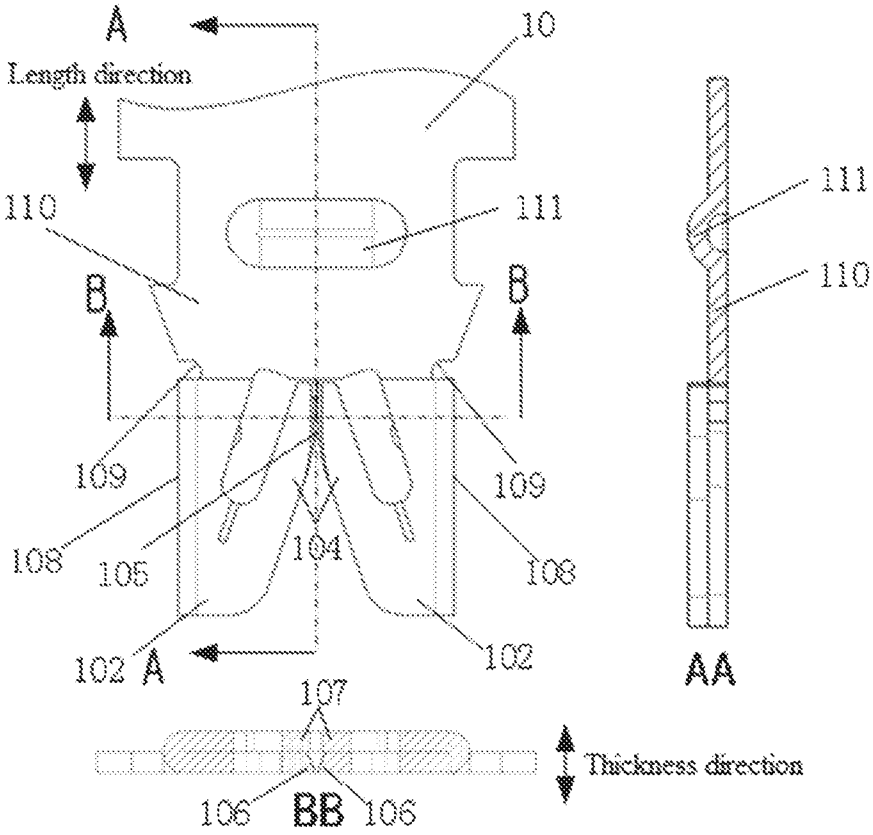
FIG. 3 shows a front view of the conductive terminal according to the first embodiment of the present disclosure, as well as cross-sectional views of the conductive terminal taken along lines A-A and B-B.

FIG. 2 shows a perspective view of the conductive terminal 10 according to this embodiment. FIG. 3 shows a front view of the conductive terminal 10, as well as the cross-sectional views of the conductive terminal taken along lines A-A and B-B. In this embodiment, the conductive terminal 10 used for connecting with the wire 2 at least has a portion extending along the thickness direction and the length direction, as shown in FIG. 2. The conductive terminal 10 includes a first pair of elastic arms 101 and a second pair of elastic arms 102. The first pair of elastic arms 101 and the second pair of elastic arms 102 are disposed to be stacked along the thickness direction. The first pair of elastic arms 101 is located at a lower end, and the second pair of elastic arms 102 is located at an upper end. In this embodiment, both the thickness of the first pair of elastic arms 101 and the thickness of the second pair of elastic arms 102 are mm, which is less than the thickness of 0.5 mm of the elastic arm of the conductive terminal in the prior art. The first pair of elastic arms 101 includes a first pair of sub arms 103 opposite to each other, and the second pair of elastic arms 102 includes a second pair of sub arms 104 opposite to each other. The first pair of sub arms 103 includes a first pair of wire contact parts 105 disposed thereon, respectively, and the first pair of sub arms is configured to pierce the insulation layer of the wire 2 via the first pair of wire contact parts 105, so that the first pair of wire contact parts 105 forms an electrical connection with the wire 2. When using the first pair of elastic arms 101 with a small thickness to connect with the fine wire 2, the positive force provided by the first pair of elastic arms 101 is smaller when piercing the wire 2, this prevents cutting of the wire 2.

Furthermore, the first pair of wire contact parts 105 only includes a first pair of raised edges 106 which are sharp and disposed thereon respectively. Each raised edge in the first pair of raised edges 106 extends along an extension direction of the corresponding sub arm, in the first pair of sub arms 103 where it is located. The two raised edges in the first pair of raised edges 106 are located at the same horizontal position in the thickness direction, and the first pair of raised edges is used to cooperatively pierce the insulation layer of the wire 2, thereby forming an electrical connection with the wire.

Figure 4:
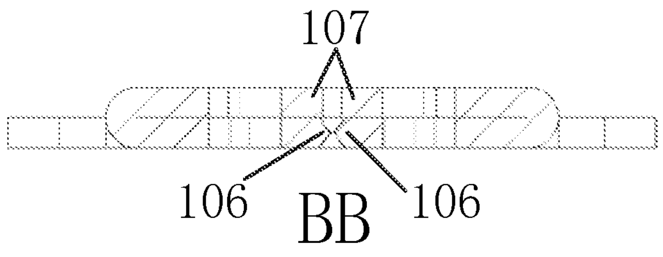
FIG. 4 is a cross-sectional view of another conductive terminal according to the first embodiment of the present disclosure, taken along line B-B.

As can be seen from the cross-sectional view taken along line B-B in FIG. 3, each of the first pair of raised edges 106 is formed in a wedge shape with the pointed part being located on one side, which is formed by stamping downwards along the thickness direction with a machining tool. In addition, FIG. 4 shows a cross-sectional view of another conductive terminal 10, taken along line B-B. In this embodiment, each of the first pair of raised edges 106 is in a V shape with the pointed part being located in the middle, which is formed by stamping upwards and downwards along the thickness direction with a machining tool. The spacing between the first pair of raised edges 106 varies with the extension of the first pair of sub arms 103 where the raised edges are located, so that the conductive terminal 10 is suitable for connecting wires 2 of different diameters.

Figure 5:
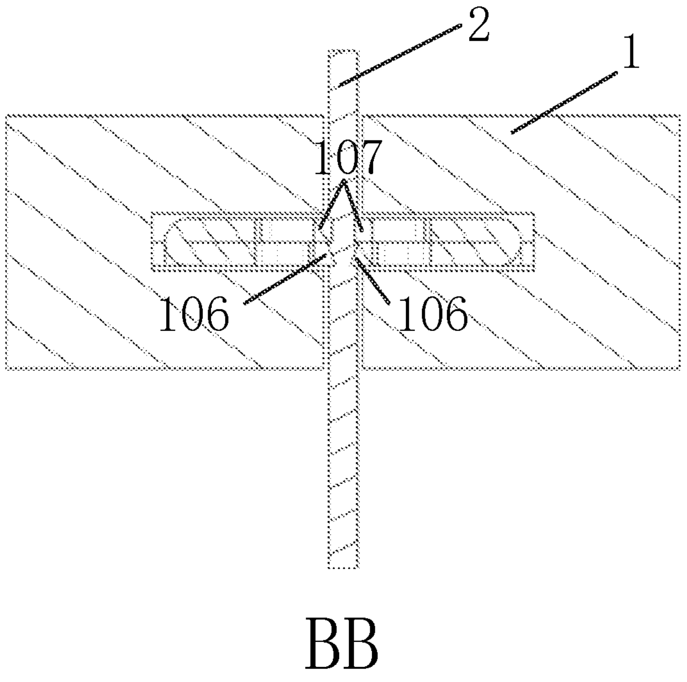
FIG. 5 is a cross-sectional view of the conductive terminal in a terminal frame according to the first embodiment of the present disclosure, taken along line B-B.

Furthermore, the second pair of sub arms 104 of the conductive terminal 10 forms clamping parts 107 which are configured to clamp the wire 2 when the first pair of wire contact parts 105 connects with the wire. FIG. 5 shows a cross-sectional view taken along the original line B-B when the conductive terminal 10 is connected with the wire 2 in the terminal frame 1. The spacing between the clamping parts 107 is greater than the spacing between the first pair of wire contact parts 105 and less than the outer diameter of the wire 2. The arrangement of the clamping parts 107 can reduce the internal stress of the wire 2 while the wire is pierced by the first pair of wire contact parts 105. This avoids the deformation of the wire 2, and ensures a good electrical connection effect.

In this embodiment, the conductive terminal 10 further includes a connecting part 108. Referring to FIG. 2, the connecting part 108 connects the first pair of elastic arms 101 with the second pair of elastic arms 102. One pair of the first pair of elastic arms 101 and the second pair of elastic arms 102 is configured to be stacked on the other pair of elastic arms by bending the connecting part 108. While manufacturing the conductive terminal 10 via sheet metal, stress concentration occurs at the bent corners, and the sheet metal is prone to tearing at the bent corner. Therefore, the conductive terminal 10 further includes a relief 109 disposed adjacent to the connecting part 108 to prevent the sheet metal from breaking or deforming during processing. In the alternative, the stacking of the two pairs of elastic arms can be achieved not only by bending, but also other methods such as crimping.

Figure 6:
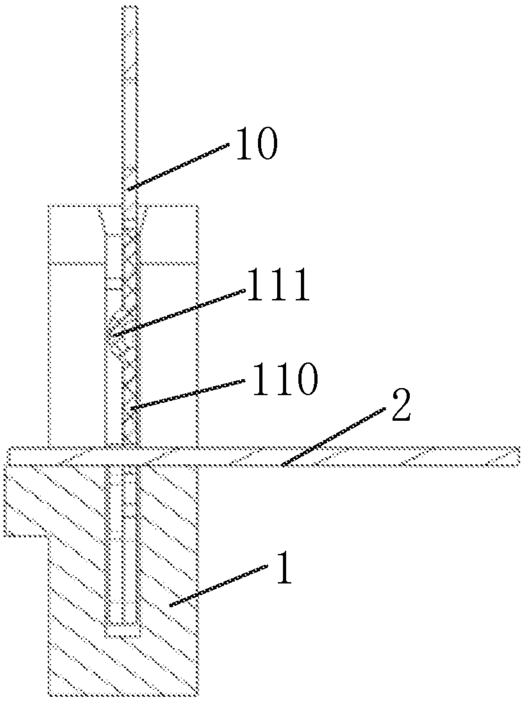
FIG. 6 is a cross-sectional view of the conductive terminal in the terminal frame according to the first embodiment of the present disclosure, taken along line A-A.

The conductive terminal 10 further includes a base 110 which is connected to one pair of the first pair of elastic arms 101 and the second pair of elastic arms 102. Optionally, the base 110 further includes a protrusion 111 disposed on its surface. The protrusion 111 at least partially protrudes along the thickness direction, and is configured to restrict the movement of the conductive terminal 10 within the terminal frame 1. FIG. 6 shows a cross-sectional view taken along the original line A-A when the conductive terminal 10 is connected with the wire 2 in the terminal frame 1. In this embodiment, the thickness of the protrusion 111 of the conductive terminal 10 is 0.5 mm, which is the same as the total thickness of the elastic arms of the conductive terminal 10. The protrusion 111 is not limited to the circular convex hull shown in FIG. 7, but can also be block shaped or other shaped.

Second Embodiment

Figure 7:
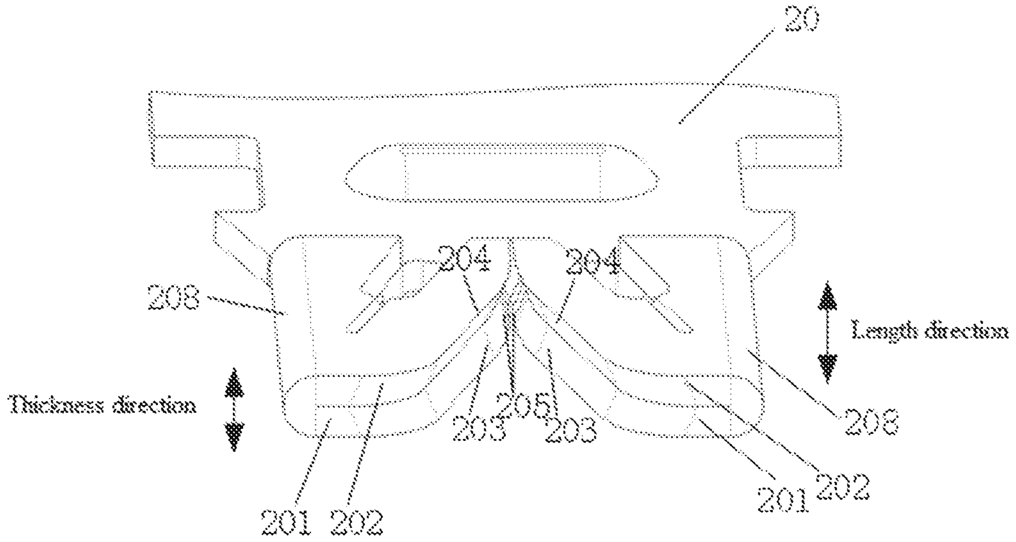
FIG. 7 is a perspective view of the conductive terminal according to a second embodiment of the present disclosure.
Figure 8:
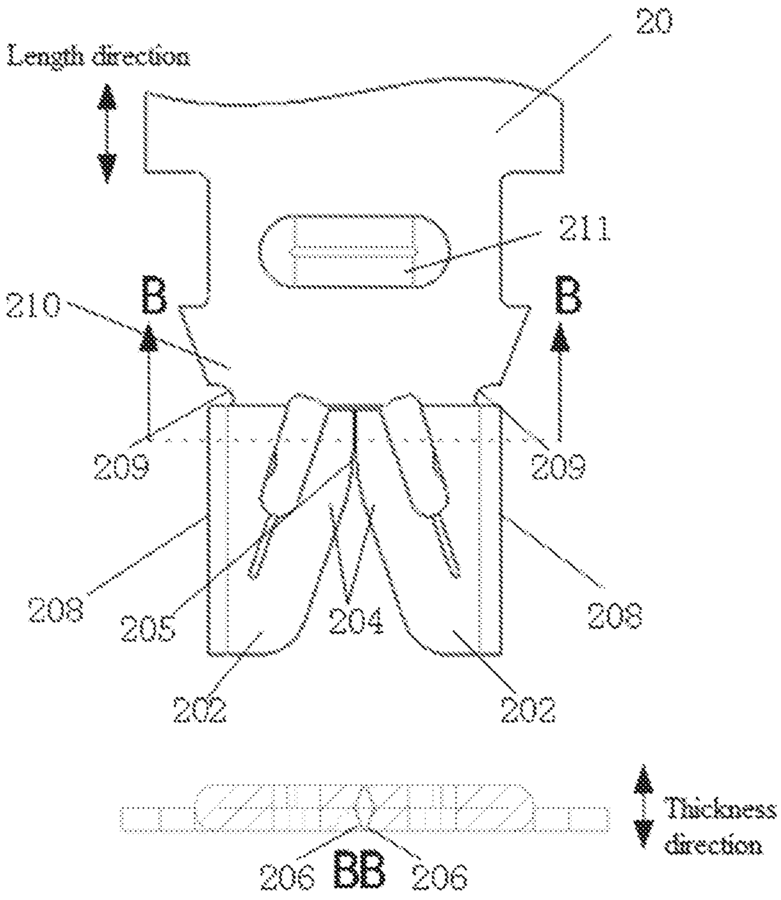
FIG. 8 shows a front view of the conductive terminal according to the second embodiment of the present disclosure, as well as a cross-sectional view of the conductive terminal taken along line B-B.

FIG. 7 shows a perspective view of a conductive terminal 20 according to a second embodiment. FIG. 8 shows a front view of the conductive terminal 20, as well as a cross-sectional view taken along line B-B. In this embodiment, the conductive terminal 20 used for connecting with the wire 2 at least has a portion extending along the thickness direction and the length direction, as shown in FIG. 7. Having the same arrangement as the conductive terminal of the first embodiment, the conductive terminal 20 includes a first pair of elastic arms 201 and a second pair of elastic arms 202. The first pair of elastic arms and the second pair of elastic arms are stacked along the thickness direction. In this embodiment, both the thickness of the first pair of elastic arms 201 and the thickness of the second pair of elastic arms 202 are 0.25 mm, which is less than the thickness of 0.5 mm of the elastic arm of the conductive terminal in the prior art. The first pair of elastic arms 201 includes a first pair of sub arms 203 opposite to each other, and the second pair of elastic arms 202 includes a second pair of sub arms 204 opposite to each other. The first pair of sub arms 203 includes a first pair of wire contact parts 205 disposed thereon, respectively. The first pair of sub arms 203 pierces the insulation layer of the wire 2 via the first pair of wire contact parts 205, so that the first pair of wire contact parts forms an electrical connection with the wire.

Further, the first pair of wire contact parts 205 only includes a first pair of raised edges 206 which are sharp and disposed thereon respectively. Each raised edge in the first pair of raised edges 206 is disposed to extend along an extension direction of the corresponding sub arm, in the first pair of sub arms 203 where it is located. The two raised edges in the first pair of raised edges 206 are located at the same horizontal position in the thickness direction. And the first pair of raised edges 206 is used to cooperatively pierce the insulation layer of the wire 2, thereby forming an electrical connection with the wire.

Figure 9:
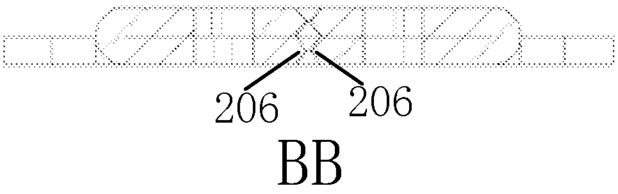
FIG. 9 is a cross-sectional view of another conductive terminal according to the second embodiment of the present disclosure, taken along line B-B.

Similar to the conductive terminal 10 in the first embodiment, the first pair of raised edges 206 is not limited to the wedge shape shown in FIG. 8. FIG. 9 shows a cross-sectional view of another conductive terminal 20 taken along line B-B. In this embodiment, each edge of the first pair of raised edges 206 is V-shaped as shown in FIG. 9. The first pair of raised edges 206 shown in FIG. 8 and FIG. 9 has the same processing method as the first pair of raised edges 106 in the conductive terminal 10 of the first embodiment. The spacing between the first pair of raised edges 206 varies with the extension of the sub arms where the raised edges are located, so that the conductive terminal 20 is suitable for connecting wires 2 of different diameters.

The second pair of sub arms 204 includes a second pair of wire contact parts disposed thereon, respectively. The structure of the second pair of wire contact parts is the same as that of the first pair of wire contact parts 205. When using the first pair of elastic arms 201 and the second pair of elastic arms 202 with a small thickness to connect with the fine wire 2, the positive force provided by the two pairs of elastic arms is smaller when piercing the wire 2, which can avoid cutting the wire off.

In this embodiment, the conductive terminal 20 further includes a connecting part 208. The connecting part 208 of the conductive terminal 20 in this embodiment has the same arrangement and structure as the connecting part 108 of the conductive terminal 10 in the first embodiment. Moreover, the conductive terminal 20 in this embodiment further includes a relief 209. The relief 209 of the conductive terminal 20 in this embodiment has the same arrangement, structure, and technical effect as the relief 109 of the conductive terminal 10 in the first embodiment. Moreover, the conductive terminal 20 in this embodiment further includes a base 210 and a protrusion 211 arranged on the base 210. The base 210 and protrusion 211 of the conductive terminal 20 in this embodiment have the same arrangement, structure, and technical effect as the base 110 and protrusion 111 of the conductive terminal 10 in the first embodiment. Reference can be made to the first embodiment for the detail of the connecting part 208, relief 209, base 210, and protrusion 211 of the conductive terminal 20, which will not be repeated here.

Third Embodiment

Figure 10:
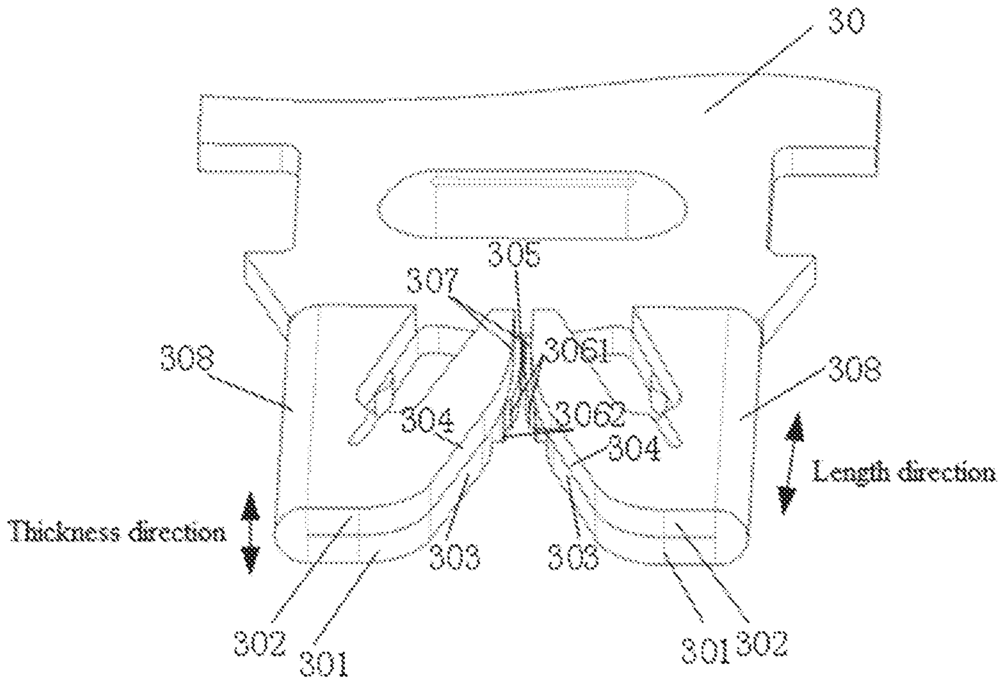
FIG. 10 is a perspective view of the conductive terminal according to a third embodiment of the present disclosure.
Figure 11:
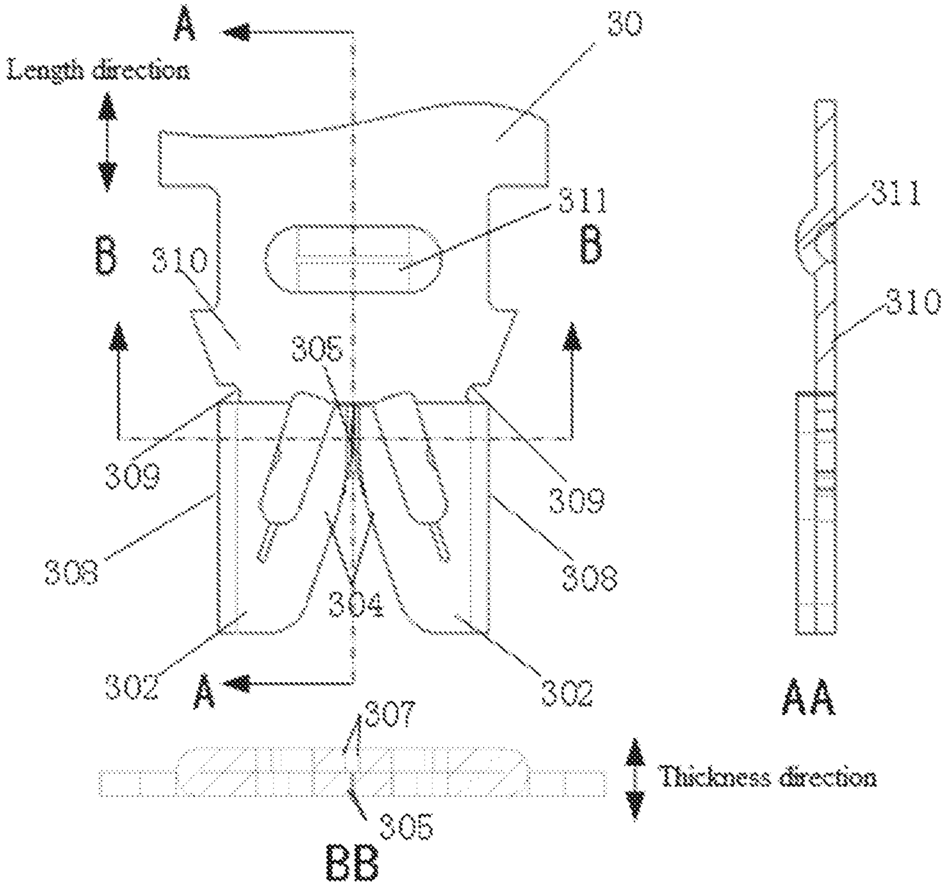
FIG. 11 shows a front view of the conductive terminal according to the third embodiment of the present disclosure, as well as the cross-sectional views of the conductive terminal taken along lines A-A and B-B.

FIG. 10 shows a perspective view of a conductive terminal 30. FIG. 11 shows a front view of the conductive terminal 30, as well as the cross-sectional views of the conductive terminal taken along lines A-A and B-B. In this embodiment, the conductive terminal 30 used for connecting with the wire 2 at least has a portion extending along the thickness direction and the length direction, as shown in FIG. 10. The conductive terminal 30 includes a first pair of elastic arms 301 and a second pair of elastic arms 302. The first pair of elastic arms and the second pair of elastic arms are disposed to be stacked along the thickness direction. The first pair of elastic arms 301 is located at a lower end, and the second pair of elastic arms 302 is located at an upper end. In this embodiment, both the thickness of the first pair of elastic arms 301 and the thickness of the second pair of elastic arms 302 are 0.25 mm, which is less than the thickness of 0.5 mm of the elastic arm of the conductive terminal in the prior art. The first pair of elastic arms 301 includes a first pair of sub arms 303 opposite to each other, and the second pair of elastic arms 302 includes a second pair of sub arms 304 opposite to each other. The first pair of sub arms 303 includes a first pair of wire contact parts 305 disposed thereon, and the first pair of sub arms 303 is used to pierce the insulation layer of the wire 2, so that the first pair of wire contact parts forms an electrical connection with the wire. When using the first pair of elastic arms 301 with a small thickness to connect with the fine wire 2, the positive force provided by the first pair of elastic arms is smaller when piercing the wire, which can avoid cutting the wire.

Figure 12:
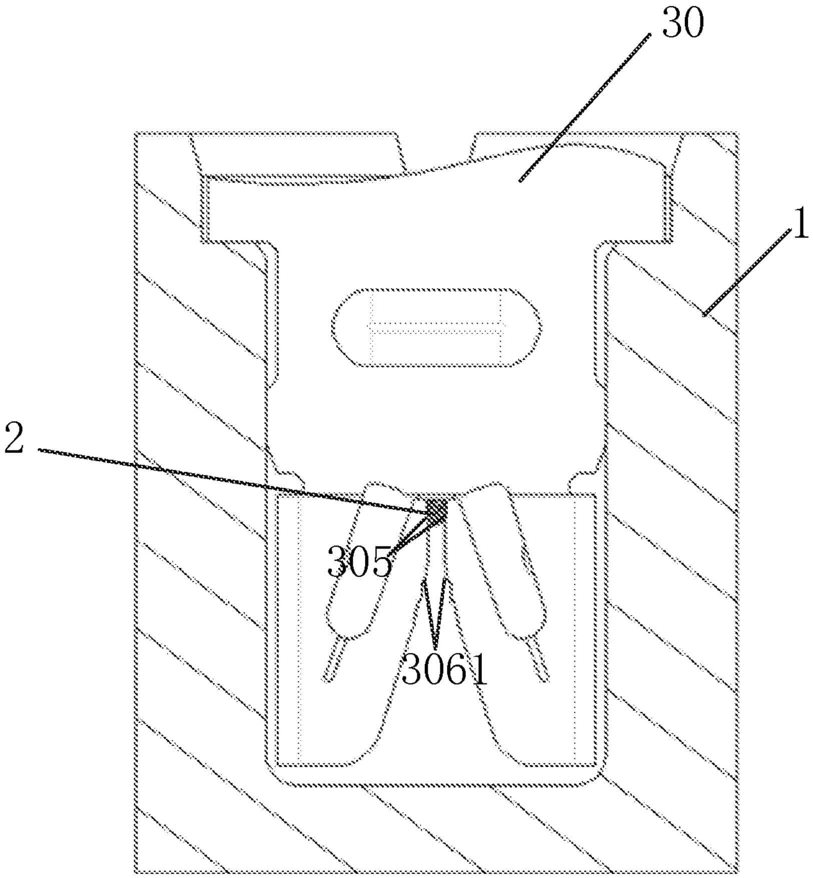
FIG. 12 is a schematic diagram of the conductive terminal in the terminal frame according to the third embodiment of the present disclosure.

Further, the first pair of sub arms 303 includes a first pair of protruding edges 3061 which are sharp and disposed thereon respectively. Each protruding edge in the first pair of protruding edges 3061 is disposed to extend along the thickness direction. The two protruding edges in the first pair of protruding edges 3061 are located at the same horizontal position in the length direction. The first pair of protruding edges 3061 is used to cooperatively scrape off the insulation layer of the wire 2. As the conductive terminal 30 is continuously inserted downwards into the terminal frame 1 holding the wire 2 (refer to FIG. 1 and FIG. 12), the first pair of wire contact parts 305 forms an electrical connection with the wire. FIG. 12 shows a schematic diagram of the conductive terminal 30 being kept within the terminal frame 1 after scraping the wire 2 to form an electrical connection with the wire.

Optionally, as shown in FIG. 10, the first pair of sub arms 303 further includes a second pair of protruding edges 3062 which are sharp and disposed thereon respectively. The second pair of protruding edges 3062 has the same arrangement as the first pair of protruding edges 3061. However, the spacing between the second pair of protruding edges 3062 is different from the spacing between the first pair of protruding edges 3061, so that the conductive terminal 30 is suitable for connecting wires 2 of different diameters. The protruding edges can be formed by stamping along the thickness direction with a machining tool.

The second pair of sub arms 304 of the conductive terminal 30 forms clamping parts 307 which are configured to clamp the wire 2 when the first pair of wire contact parts 305 connects with the wire. The spacing between the clamping parts 307 is greater than the spacing between the first pair of wire contact parts 305 and less than the outer diameter of the wire 2. The arrangement of the clamping parts 307 can reduce the internal stress of the wire 2 while the first pair of wire contact parts 305 connects with the wire, avoid the deformation of the wire, thus ensuring a strong electrical connection.

In this embodiment, the conductive terminal 30 further includes a connecting part 308. The connecting part 308 of the conductive terminal 30 in this embodiment has the same arrangement and structure as the connecting part 108 of the conductive terminal 10 in the first embodiment. Moreover, the conductive terminal 30 in this embodiment further includes a relief 309. The relief 309 of the conductive terminal 30 in this embodiment has the same arrangement, structure, and technical effect as the relief 109 of the conductive terminal 10 in the first embodiment. The conductive terminal 30 further includes a base 310 and a protrusion 311 arranged on the base. The base 310 and protrusion 311 of the conductive terminal 30 have the same arrangement, structure, and technical effect as the base 110 and protrusion 111 of the conductive terminal 10 in the first embodiment. Reference can be made to the first embodiment for the detail of the connecting part 308, relief 309, base 310, and protrusion 311 of the conductive terminal 30, which will not be repeated herein.

Fourth Embodiment

Figure 13:
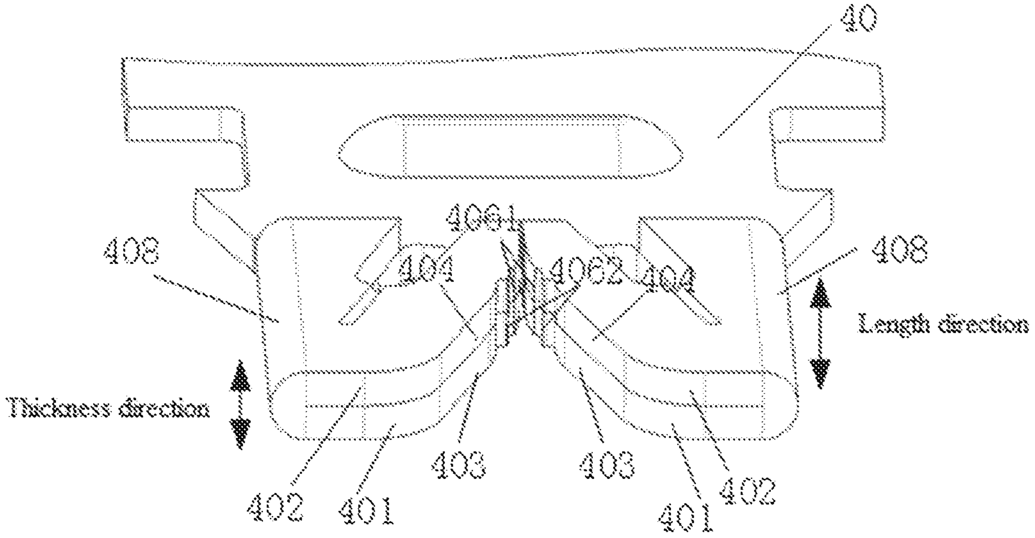
FIG. 13 is a perspective view of the conductive terminal according to a fourth embodiment of the present disclosure.
Figure 14:
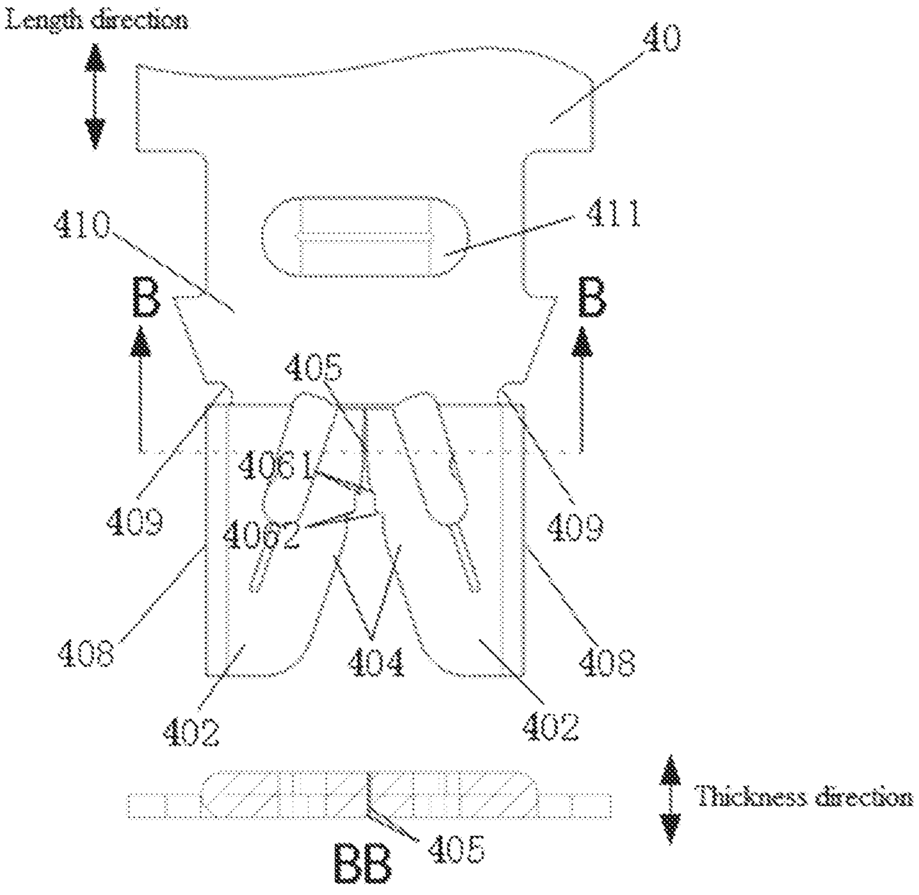
FIG. 14 shows a front view of the conductive terminal according to the fourth embodiment of the present disclosure, as well as a cross-sectional view of the conductive terminal taken along line B-B.

FIG. 13 shows a perspective view of a conductive terminal 40 according to another embodiment. FIG. 14 shows a front view of the conductive terminal 40, as well as a cross-sectional view taken along line B-B. In this embodiment, the conductive terminal 40 used for connecting with the wire 2 at least has a portion extending along the thickness direction and the length direction, as shown in FIG. 13. Having the same arrangement as the conductive terminal of the first embodiment, the conductive terminal 40 includes a first pair of elastic arms 401 and a second pair of elastic arms 402. The first pair of elastic arms 401 and the second pair of elastic arms 402 are disposed to be stacked along the thickness direction. In this embodiment, both the thickness of the first pair of elastic arms 401 and the thickness of the second pair of elastic arms 402 are 0.25 mm, which is less than the thickness of 0.5 mm of the elastic arm of the conductive terminal in the prior art. The first pair of elastic arms 401 includes a first pair of sub arms 403 opposite to each other, and the second pair of elastic arms 402 includes a second pair of sub arms 404 opposite to each other. The first pair of sub arms 403 includes a first pair of wire contact parts 405 disposed thereon respectively. The first pair of sub arms 403 is used to pierce the insulation layer of the wire 2, so that the first pair of wire contact parts 405 forms an electrical connection with the wire.

Furthermore, the first pair of sub arms 403 includes a first pair of protruding edges 4061 which are sharp and disposed thereon respectively. Each protruding edge in the first pair of protruding edges 4061 is disposed to extend along the thickness direction. The two protruding edges in the first pair of protruding edges 4061 are located at the same horizontal position in the length direction. The first pair of protruding edges 4061 is used to cooperatively scrape off the insulation layer of the wire 2. As the conductive terminal 30 is continuously inserted downwards into the terminal frame 1 holding the wire 2 (see FIG. 1 and FIG. 12), the first pair of wire contact parts 405 forms an electrical connection with the wire.

Optionally, as shown in FIG. 13, the first pair of sub arms 403 further includes a second pair of protruding edges 4062 which are sharp and disposed thereon respectively. The second pair of protruding edges 4062 has the same arrangement as the first pair of protruding edges 4061. However, the spacing between the second pair of protruding edges 4062 is different from the spacing between the first pair of protruding edges 4061, so that the conductive terminal 40 is suitable for connecting wires 2 of different diameters. The protruding edges can be formed by stamping along the thickness direction with a machining tool.

The structure of the second pair of sub arms 404 is the same as that of the first pair of sub arms 403. While using the first pair of sub arms 403 and the second pair of sub arms 404 with a small thickness to scrape the fine wire 2 and further to establish a connection between the wire contact parts and the wire, the two pairs of elastic arms provide a smaller positive force when connecting with the wire, which can prevent accidental cutting of the wire.

In this embodiment, the conductive terminal 40 further includes a connecting part 408. The connecting part 408 of the conductive terminal 40 in this embodiment has the same arrangement and structure as the connecting part 108 of the conductive terminal 10 in the first embodiment. Moreover, the conductive terminal 40 in this embodiment further includes a relief 409. The relief 409 of the conductive terminal 40 in this embodiment has the same arrangement, structure, and technical effect as the relief 109 of the conductive terminal 10 in the first embodiment. Moreover, the conductive terminal 40 in this embodiment further includes a base 410 and a protrusion 411 arranged on the base 410. The base 410 and protrusion 411 of the conductive terminal 40 in this embodiment have the same arrangement, structure, and technical effect as the base 110 and protrusion 111 of the conductive terminal 10 in the first embodiment. Reference can be made to the first embodiment for the detail of the connecting part 408, relief 409, base 410, and protrusion 411 of the conductive terminal 40, which will not be repeated here.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A conductive terminal adapted to connect to a wire, comprising:

a first pair of elastic arms including a first pair of sub arms arranged opposite to each other, respectively, the first pair of sub arms comprising a first pair of wire contact parts disposed thereon, respectively, and adapted to pierce an insulation layer of the wire such that the first pair of wire contact parts electrically connects to the wire, the first pair of wire contact parts comprises a first pair of protruding edges, and the first pair of sub arms further comprises a second pair of protruding edges, a spacing between the second pair of protruding edges being different from a spacing between the first pair of protruding edges; and a second pair of elastic arms arranged adjacent to the first pair of elastic arms along a thickness direction of the terminal, the second pair of elastic arms comprising a second pair of sub arms arranged opposite to each other.

2. The conductive terminal according to claim 1, wherein each protruding edge in the first pair of protruding edges extending along an extension direction of a corresponding sub arm of the first pair of sub arms.

3. The conductive terminal according to claim 2, wherein the two protruding edges of the first pair of protruding edges are disposed at the same horizontal position in the thickness direction and are adapted to cooperatively pierce the insulation layer of the wire.

4. The conductive terminal according to claim 3, wherein a structure of the second pair of sub arms is the same as that of the first pair of sub arms.

5. The conductive terminal according to claim 2, wherein the second pair of sub arms comprises a second pair of wire contact parts disposed thereon, respectively, and a structure of the second pair of wire contact parts is the same as that of the first pair of wire contact parts.

6. The conductive terminal according to claim 1, wherein the first pair of sub arms includes a first pair of protruding edges extending along the thickness direction and disposed at the same horizontal position in a length direction of the terminal, the first pair of protruding edges adapted to cooperatively remove an insulation layer of the wire.

7. The conductive terminal according to claim 1, wherein a thickness of the first pair of elastic arms and a thickness of the second pair of elastic arms are each approximately 0.25 mm.

8. The conductive terminal according to claim 1, wherein the second pair of sub arms defines clamping parts adapted to clamp the wire when the first pair of wire contact parts connects with the wire.

9. The conductive terminal according to claim 8, wherein a spacing between the clamping parts is greater than a spacing between the first pair of wire contact parts.

10. The conductive terminal according to claim 1, further comprising a connecting part connecting the first pair of elastic arms with the second pair of elastic arms.

11. The conductive terminal according to claim 10, wherein each elastic arm of the first pair of elastic arms is stacked on a respective one of the elastic arms of the second pair of elastic arms by bending the connecting part.

12. The conductive terminal according to claim 11, further comprising a relief formed adjacent to the connecting part.

13. The conductive terminal according to claim 1, further comprising a base connected to one pair of elastic arms in the first pair of elastic arms or the second pair of elastic arms.

14. The conductive terminal according to claim 13, wherein the base further comprises a protrusion disposed on a surface thereof, the protrusion at least partially extending along the thickness direction and adapted to restrict movement of the conductive terminal within a terminal frame.

15. An insulation displacement terminal adapted to connect to a wire, comprising:

a first pair of elastic arms including a first pair of sub arms arranged opposite to each other in a width direction of the terminal, the first pair of sub arms having a first pair of wire contact parts disposed thereon and adapted to pierce an insulation layer of the wire, the first pair of wire contact parts define a first pair of protruding edges, and the first pair of sub arms further comprises a second pair of protruding edges, a spacing between the second pair of protruding edges being different from a spacing between the first pair of protruding edges; and a second pair of elastic arms arranged directly adjacent to the first pair of elastic arms in a thickness direction of the terminal, the second pair of elastic arms having a second pair of sub arms arranged opposite to each other in the width direction.

16. The terminal according to claim 15, wherein each protruding edge in the first pair of protruding edges extending along an extension direction of a corresponding sub arm of the first pair of sub arms.

17. The terminal according to claim 16, wherein the two protruding edges in the first pair of protruding edges are disposed at the same horizontal position in a length direction of the terminal and are adapted to cooperatively remove the insulation layer of the wire.

18. The conductive terminal according to claim 16, wherein the second pair of sub arms comprises a second pair of wire contact parts disposed thereon, a structure of the second pair of wire contact parts is the same as that of the first pair of wire contact parts.

19. A conductive terminal adapted to connect to a wire, comprising:

a first pair of elastic arms including a first pair of sub arms arranged opposite to each other, respectively, the first pair of sub arms comprising a first pair of wire contact parts disposed thereon, respectively, and adapted to pierce an insulation layer of the wire such that the first pair of wire contact parts electrically connects to the wire; and a second pair of elastic arms arranged adjacent to the first pair of elastic arms along a thickness direction of the terminal, the second pair of elastic arms comprising a second pair of sub arms arranged opposite to each other, a thickness of the first pair of elastic arms and a thickness of the second pair of elastic arms are each approximately 0.25 mm.

20. A conductive terminal adapted to connect to a wire, comprising:

a first pair of elastic arms including a first pair of sub arms arranged opposite to each other, respectively, the first pair of sub arms comprising a first pair of wire contact parts disposed thereon, respectively, and adapted to pierce an insulation layer of the wire such that the first pair of wire contact parts electrically connects to the wire; and a second pair of elastic arms arranged adjacent to the first pair of elastic arms along a thickness direction of the terminal, the second pair of elastic arms comprising a second pair of sub arms arranged opposite to each other, the second pair of sub arms defines clamping parts adapted to clamp the wire when the first pair of wire contact parts connects with the wire, a spacing between the clamping parts is greater than a spacing between the first pair of wire contact parts.

21. A conductive terminal adapted to connect to a wire, comprising:

a first pair of elastic arms including a first pair of sub arms arranged opposite to each other, respectively, the first pair of sub arms comprising a first pair of wire contact parts disposed thereon, respectively, and adapted to pierce an insulation layer of the wire such that the first pair of wire contact parts electrically connects to the wire;

a second pair of elastic arms arranged adjacent to the first pair of elastic arms along a thickness direction of the terminal, the second pair of elastic arms comprising a second pair of sub arms arranged opposite to each other; and a connecting part connecting the first pair of elastic arms with the second pair of elastic arms, each elastic arm of the first pair of elastic arms is stacked on a respective one of the elastic arms of the second pair of elastic arms by bending the connecting part.

22. A conductive terminal adapted to connect to a wire, comprising:

a first pair of elastic arms including a first pair of sub arms arranged opposite to each other, respectively, the first pair of sub arms comprising a first pair of wire contact parts disposed thereon, respectively, and adapted to pierce an insulation layer of the wire such that the first pair of wire contact parts electrically connects to the wire;

a second pair of elastic arms arranged adjacent to the first pair of elastic arms along a thickness direction of the terminal, the second pair of elastic arms comprising a second pair of sub arms arranged opposite to each other; and a base connected to one pair of elastic arms in the first pair of elastic arms or the second pair of elastic arms, the base includes a protrusion disposed on a surface thereof, the protrusion at least partially extending along the thickness direction and adapted to restrict movement of the conductive terminal within a terminal frame.

* * * * *